(12) United States Patent
Nakamura et al.

(10) Patent No.: US 10,977,505 B2
(45) Date of Patent: Apr. 13, 2021

(54) OCCUPANT MONITORING DEVICE FOR VEHICLE

(71) Applicant: SUBARU CORPORATION, Tokyo (JP)

(72) Inventors: Ryota Nakamura, Tokyo (JP); Masayuki Marubashi, Tokyo (JP); Keita Onishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 102 days.

(21) Appl. No.: 16/207,367

(22) Filed: Dec. 3, 2018

(65) Prior Publication Data

US 2019/0236385 A1 Aug. 1, 2019

(30) Foreign Application Priority Data

Feb. 1, 2018 (JP) ................. 2018-016559

(51) Int. Cl.
  *G06K 9/00* (2006.01)
  *G06F 16/22* (2019.01)
  *H04N 7/18* (2006.01)

(52) U.S. Cl.
  CPC ......... *G06K 9/00838* (2013.01); *G06F 16/22* (2019.01); *G06K 9/00288* (2013.01); *H04N 7/188* (2013.01)

(58) Field of Classification Search
  CPC .. B60W 40/08; B60W 40/09; B60W 2420/42; B60W 2540/043; G06K 9/00845;
  (Continued)

(56) References Cited

U.S. PATENT DOCUMENTS 9,988,055 B1 * 6/2018 O'Flaherty ............ G08B 21/06
2006/0072792 A1 4/2006 Toda et al.
(Continued)

FOREIGN PATENT DOCUMENTS

JP 2006-099395 A 4/2006
JP 2006327346 12/2006
(Continued)

OTHER PUBLICATIONS

Office Action for JP Patent Application No. 2018-016559, dated Jul. 16, 2019, 04 pages of Office Action and 04 pages of English Translation.

*Primary Examiner* — Margaret G Mastrodonato
(74) *Attorney, Agent, or Firm* — Chip Law Group

(57) ABSTRACT

An occupant monitoring device is mountable in a vehicle, and configured to monitor one or more occupants riding in the vehicle. The occupant monitoring device includes: a recognizer that recognizes one or more occupants riding in the vehicle; a recognized occupant storage that stores occupant information recognized by the recognizer; a setting storage that stores setting for the one or more occupants, stored in the recognized occupant storage; and a monitor that monitors the one or more occupants riding in the vehicle based on the setting of the setting storage. When the recognizer is unable to identify an occupant by recognition processing, the recognized occupant storage stores guest information which does not identify the occupant, and the monitor monitors a guest who has ridden in the vehicle, based on the setting of the setting storage.

19 Claims, 9 Drawing Sheets

| INDIVIDUAL DATA | FACE DATA | OCCUPANT MONITORING | INDIVIDUAL RECOGNITION | INDIVIDUAL SETTING DATA |
|---|---|---|---|---|
| 001 | ○ | ON | ON | OCCUPANT MONITORING ON, INDIVIDUAL RECOGNITION ON, SETTING DATA (SPEAKER ON, VIBRATION ON, POSITION VALUE) |
| 002 | ◇ | OFF | ON | OCCUPANT MONITORING OFF, INDIVIDUAL RECOGNITION ON, SETTING DATA (SPEAKER ON, VIBRATION OFF, POSITION VALUE) |
| 003 | ▽ | OFF | OFF | OCCUPANT MONITORING OFF, INDIVIDUAL RECOGNITION OFF, SETTING DATA (SPEAKER OFF, VIBRATION OFF, POSITION VALUE) |

(58) Field of Classification Search
CPC ........... G06K 9/00832; G06K 9/00288; G06K 9/00838; H04N 21/41422; H04N 7/188
See application file for complete search history.

(56) References Cited

U.S. PATENT DOCUMENTS

| | | |
|---|---|---|
| 2008/0215209 A1 | 9/2008 | Ikeda et al. |
| 2010/0232658 A1 | 9/2010 | Omoto et al. |
| 2014/0316607 A1* | 10/2014 | Le .......................... B60N 2/002 701/1 |
| 2015/0258892 A1 | 9/2015 | Wu |
| 2015/0294547 A1 | 10/2015 | Ito et al. |
| 2016/0171319 A1* | 6/2016 | Nagai ................. G06K 9/00604 382/103 |
| 2017/0089274 A1* | 3/2017 | Kolhouse ............ F02D 41/0002 |
| 2018/0050664 A1* | 2/2018 | Tarte ........................ B60R 25/31 |

FOREIGN PATENT DOCUMENTS

| | | |
|---|---|---|
| JP | 2008-213634 A | 9/2008 |
| JP | 2009-113725 A | 5/2009 |
| JP | 2010213749 | 9/2010 |
| JP | 2015-115045 A | 6/2015 |
| JP | 2015-214171 A | 12/2015 |
| JP | 2017-052409 A | 3/2017 |
| JP | 2017-144834 A | 8/2017 |

\* cited by examiner

FIG. 4

| OCCUPANT MONITORING ~38 | INDIVIDUAL RECOGNITION ~39 | INATTENTIVE DRIVING DETECTION | DROWSY DRIVING DETECTION | INDIVIDUAL RECOGNITION |
|---|---|---|---|---|
| ON | ON | ENABLED | ENABLED | ENABLED |
| ON | OFF | ENABLED | ENABLED | DISABLED |
| OFF | ON | DISABLED | DISABLED | RECOGNITION PROCESSING ONLY (ID IDENTIFICATION FLAG = INDEFINITE) |
| OFF | OFF | DISABLED | DISABLED | DISABLED |

| INDIVIDUAL DATA | FACE DATA | OCCUPANT MONITORING | INDIVIDUAL RECOGNITION | INDIVIDUAL SETTING DATA |
|---|---|---|---|---|
| 001 | ○ | ON | ON | OCCUPANT MONITORING ON, INDIVIDUAL RECOGNITION ON, SETTING DATA (SPEAKER ON, VIBRATION ON, POSITION VALUE) |
| 002 | ◇ | OFF | ON | OCCUPANT MONITORING OFF, INDIVIDUAL RECOGNITION ON, SETTING DATA (SPEAKER ON, VIBRATION OFF, POSITION VALUE) |
| 003 | ▽ | OFF | OFF | OCCUPANT MONITORING OFF, INDIVIDUAL RECOGNITION OFF, SETTING DATA (SPEAKER OFF, VIBRATION OFF, POSITION VALUE) |

OCCUPANT MONITORING DEVICE FOR VEHICLE

CROSS-REFERENCE TO RELATED APPLICATIONS

The present application claims priority from Japanese Patent Application No. 2018-016559 filed on Feb. 1, 2018, the entire contents of which are hereby incorporated by reference.

BACKGROUND

1. Technical Field

The present invention relates to a device that monitors occupants of a vehicle such as an automobile.

2. Related Art

In a vehicle such as an automobile, it may be desirable that an occupant such as a driver riding in the vehicle be monitored (Japanese Unexamined Patent Application Publication (JP-A) Nos. 2006-327346 and 2010-213749).

An occupant monitoring device recognizes, for instance, an occupant riding in a vehicle, monitors inattentive driving and/or drowsy driving of a driver, and gives warning to the driver.

Thus, attention of the driver is focused on the driving of the vehicle, and improved safety can be expected.

SUMMARY OF THE INVENTION

An aspect of the present invention provides an occupant monitoring device for a vehicle. The occupant monitoring device is mountable in the vehicle, and configured to monitor one or more occupants riding in the vehicle. The occupant monitoring device includes: a recognizer configured to recognize one or more occupants riding in the vehicle; a recognized occupant storage configured to store occupant information recognized by the recognizer; a setting storage configured to store setting for the one or more occupants, stored in the recognized occupant storage; and a monitor configured to monitor the one or more occupants riding in the vehicle based on the setting of the setting storage. When the recognizer is unable to identify an occupant by recognition processing, the recognized occupant storage stores guest information which does not identify the occupant, and the monitor monitors a guest who has ridden in the vehicle, based on the setting of the setting storage.

BRIEF DESCRIPTION OF THE DRAWINGS

FIG. 4 is an explanatory table of correspondence relationships between setting values of monitoring start setting data, setting values of recognition start setting data of FIG. 3, and turn on/off states of the occupant monitoring device;

FIG. 5 is an explanatory table for the data structure of the individual database of FIG. 3;

DETAILED DESCRIPTION

Figure 1:
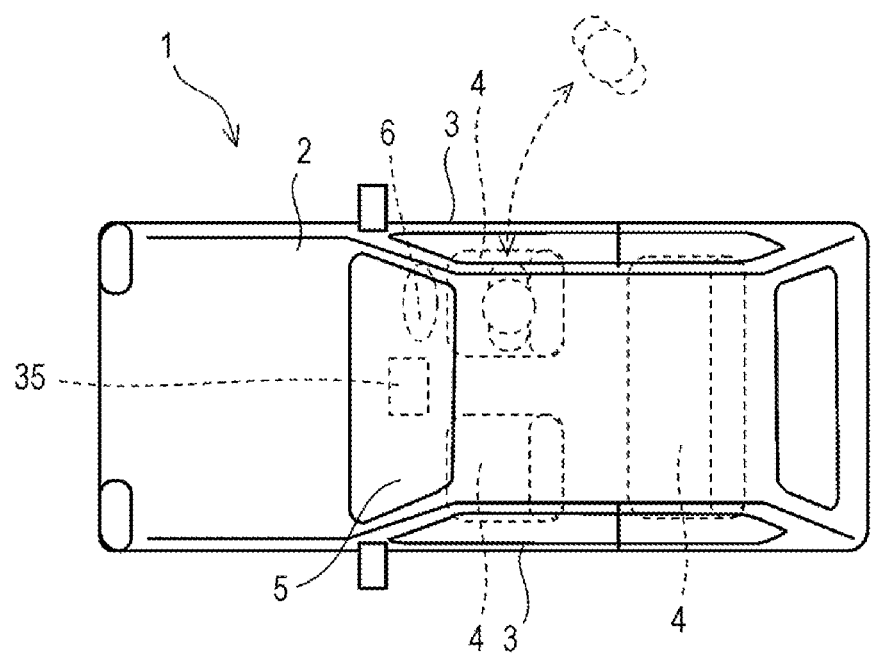
FIG. 1 is an explanatory view of an automobile to which an occupant monitoring device according to an example of the present invention is applied.

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In an occupant monitoring device, when an occupant who has been unregistered gets in an automobile, it is not possible to identify and recognize the occupant.

In this case, driving by an unregistered occupant may be prohibited as disclosed in JP-A No. 2006-327346.

It is also possible for an unregistered occupant to perform setting as disclosed in JP-A No. 2010-213749.

However, in any case, an occupant cannot drive the automobile unless the occupant performs a registration operation for the occupant.

Particularly, forcing setting of occupant monitoring without exception to an occupant who thinks occupant monitoring is unnecessary significantly reduces the convenience of the occupant.

It is desirable that the occupant monitoring device be improved in such a vehicle.

FIG. 1 is an explanatory view of an automobile 1 to which an occupant monitoring device according to an example of the present invention is applied.

The automobile 1 is an instance of a vehicle.

As a power source for driving, the automobile 1 may use an internal-combustion engine, stored electric power of a battery, or a combination of the internal-combustion engine and the stored electric power.

The automobile 1 of FIG. 1 includes a vehicle body 2 in which a passenger compartment is formed, and doors 3 provided on the sides of the vehicle body 2. An occupant such as a driver opens a door 3, goes into the passenger compartment, and sits down on a seat 4. On the front side of the seat 4 for the driver, operation members are disposed, the operation members including, for instance, a steering wheel 6 projecting backward from a dashboard 5, an ignition switch, an accelerator pedal, a brake pedal, a shift lever, and a parking lever.

The driver operates the operation members while seated on the seat 4. The automobile 1 runs, changes the direction, and stops according to an operation of the driver.

Also, an occupant such as a driver stops the automobile 1 by operating the ignition switch, then opens the door 3 to leave the passenger compartment.

Figure 2:
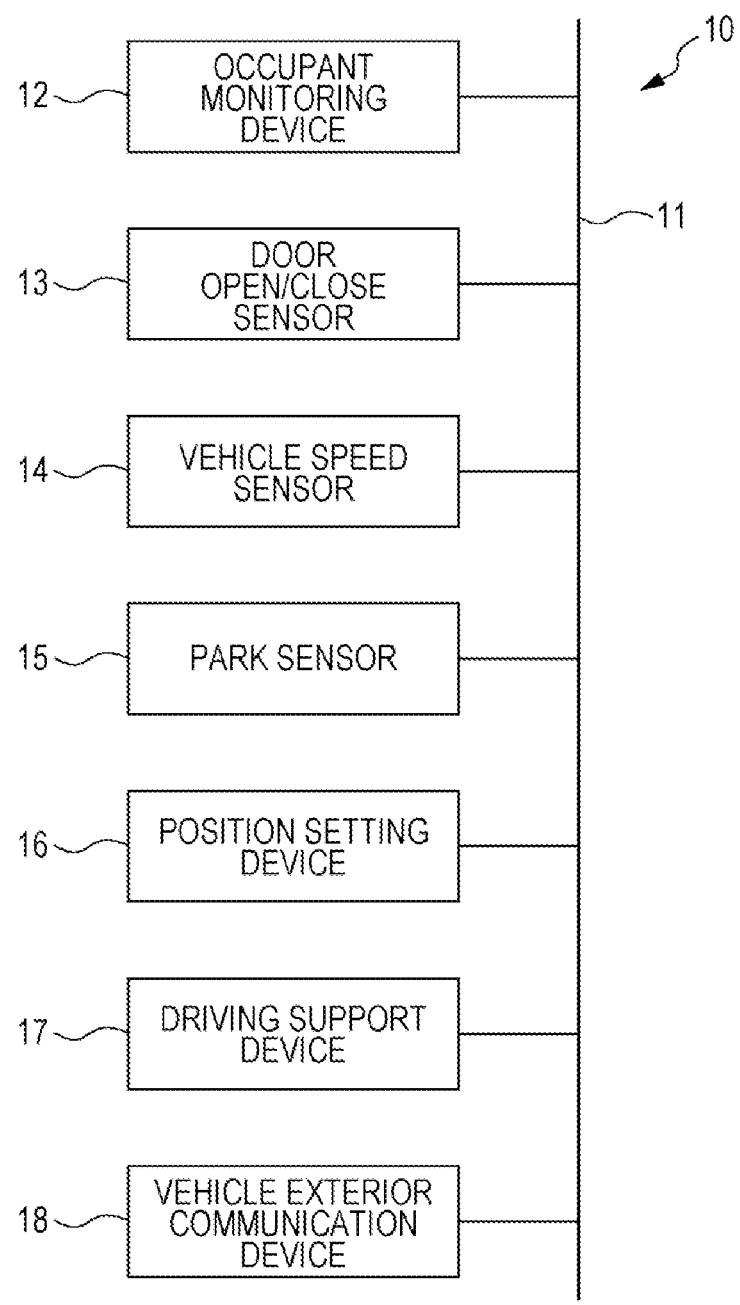
FIG. 2 is an explanatory diagram of an instance of an in-vehicle network system of the automobile of FIG. 1.

FIG. 2 is an explanatory diagram of an instance of an in-vehicle network system 10 of the automobile 1 of FIG. 1.

In the in-vehicle network system 10, multiple electronic devices capable of communicating with each other are connected via an in-vehicle network 11 to allow data communication between the electronic devices.

FIG. 2 illustrates an occupant monitoring device 12, a door open/close sensor 13, a vehicle speed sensor 14, a park sensor 15, a position setting device 16, a driving support device 17, and a vehicle exterior communication device 18 as the multiple electronic devices.

The in-vehicle network 11 may be, for instance, a wired communication network in conformity with the Controller Area Network (CAN), or the Local Interconnect Network (LIN). The in-vehicle network 11 may be a wireless communication network.

Also, after the occupants get off the vehicle, the in-vehicle network 11 may be in a sleep state in which communication is restricted. In this case, when a driver rides on the vehicle, the in-vehicle network 11 assumes a start state in which communication is possible. The in-vehicle network 11 assumes a start state from a sleep state based on detection of, for instance, a keyless entry device possessed by an occupant. The in-vehicle network 11 may include a network controller that autonomously switches between an ON state and an OFF state.

The occupant monitoring device 12 recognizes, for instance, an occupant who has entered the passenger compartment and has seated on the seat 4 for the driver, and monitors the recognized occupant for inattentive driving and/or drowsy driving. When inattentive driving and/or drowsy driving of the driver is detected, the occupant monitoring device 12 gives warning to the driver through sound. Thus, attention of the driver is focused on the driving of the automobile 1, and improved safety can be expected.

The door open/close sensor 13 detects opening of each door 3 of the automobile 1 in a closed state and closing of each door 3 in an open state.

The vehicle speed sensor 14 detects stopping and driving of the automobile 1. The vehicle speed sensor 14 may detect a running speed of the automobile 1.

The park sensor 15 detects a parking state in which the automobile 1 is maintained in a vehicle stop state. The parking state can be detected, for instance, by the operation of the shift lever to a parking position or pulling of the parking lever.

The position setting device 16 adjusts, for instance, the fore-and-aft and vertical position of the seat 4, and the angle of the backrest, the fore-and-aft and vertical position and the angle of the steering wheel 6, and the fore-and-aft and vertical positions and angles of various pedals. Also, setting data corresponding to an occupant who has sit on the seat 4 is recorded, and control is performed to adjust the positions and angles of the seat 4, the steering wheel 6, and the pedals based on the setting data. It is to be noted that the position setting device 16 may record setting data for the positions during automatic driving separately from setting data for the positions during manual driving, and may change any position according to a driving situation of the automobile 1.

The driving support device 17 controls the driving, stopping, and steering of the automobile 1 to support the driving operation of the automobile 1 by the driver. Also, the driving support device 17 may control the driving, stopping, and steering of the automobile 1 fully automatically.

The vehicle exterior communication device 18 performs bidirectional data communication with the vehicle exterior communication device 18 of each of other automobiles 1 and/or communication facilities installed on the ground using a public radio communication network or a commercial radio communication network, for instance. Thus, the automobile 1 can obtain information on traffic information, the running states of other automobiles 1 in the surrounding, and a traffic situation around the automobile 1. In addition, the vehicle exterior communication device 18 can transmit information on the driving state of the automobile 1, such as an automatic driving state, for instance.

These electronic devices mutually transmit and receive data via the in-vehicle network 11. Thus, the occupant monitoring device 12 can obtain, for instance, information necessary for its control, and can provide information necessary for the position setting device 16 and the driving support device 17.

Meanwhile, in the occupant monitoring device 12, when an occupant who has been unregistered gets in a vehicle, it is not possible to identify and recognize the occupant.

In this case, driving by an unregistered occupant may be prohibited by the occupant monitoring device 12. It is also possible for an unregistered occupant to perform setting. However, in any case, an occupant cannot drive the automobile 1 unless the occupant performs a registration operation for the occupant.

Forcing such an operation without exception to an occupant who thinks occupant monitoring is unnecessary significantly reduces the convenience of the occupant.

Thus, it is desirable that the occupant monitoring device 12 be improved in the automobile 1.

Figure 3:
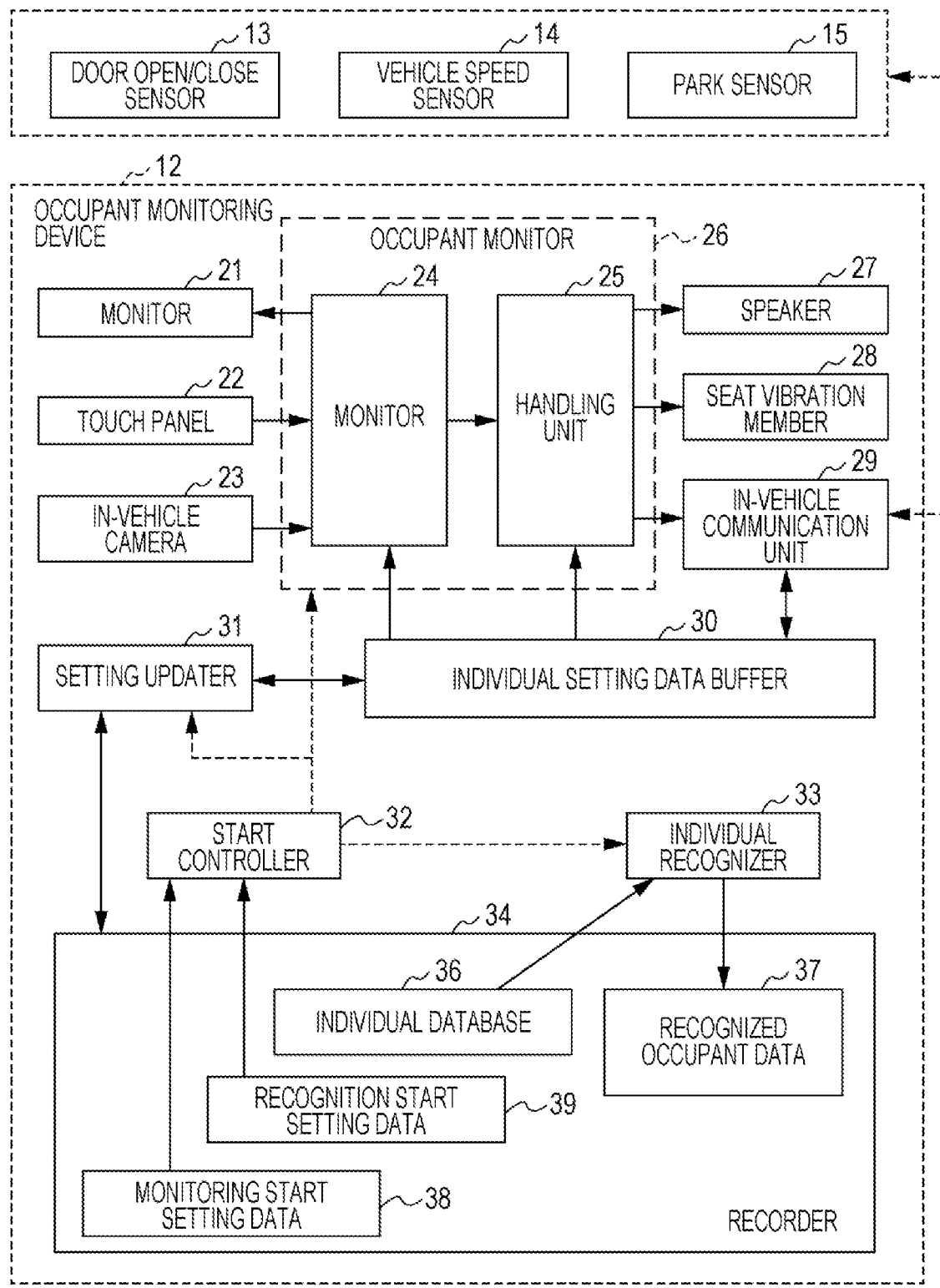
FIG. 3 is an explanatory diagram of the occupant monitoring device according to the example of the present invention.

FIG. 3 is an explanatory diagram of the occupant monitoring device 12 according to the example of the present invention.

FIG. 3 illustrates the door open/close sensor 13, the vehicle speed sensor 14, and the park sensor 15 along with the occupant monitoring device 12, and the sensors are capable of transmitting and receiving data to and from the occupant monitoring device 12 via the in-vehicle network 11. The door open/close sensor 13 transmits information on an open/close state of each door 3 to the occupant monitoring device 12. The vehicle speed sensor 14 transmits information on the speed of the automobile 1 to the occupant monitoring device 12. The park sensor 15 transmits information on whether the automobile 1 is in a parking state to the occupant monitoring device 12. An occupant monitoring system includes these sensors. These sensors may be provided as part of the occupant monitoring device 12.

The occupant monitoring device 12 of FIG. 3 includes a monitor 21, a touch panel 22, an in-vehicle camera 23, an occupant monitor 26 having a monitor 24 and a handling unit 25, a speaker 27, a seat vibration member 28, an in-vehicle communication unit 29, an individual setting data buffer 30, a setting updater 31, a start controller 32, an individual recognizer 33, and a recorder 34.

The speaker 27 and the seat vibration member 28 may be provided in the automobile 1 separately from the occupant monitoring device 12, and may be capable of transmitting and receiving data to and from the occupant monitoring device 12 via the in-vehicle network 11.

It is to be noted that the occupant monitor 26, the setting updater 31, the start controller 32, and the individual recognizer 33 may be implemented in the occupant monitoring device 12 by a microcomputer device, such as an electric control unit (ECU) of the occupant monitoring device 12, executing a program. Also, the individual setting data buffer 30, the recorder 34, and the in-vehicle communication unit 29 may be provided in the occupant monitoring device 12 with incorporated in a microcomputer device. The program may be recorded on the recorder 34.

The monitor 21 is a display member such as a liquid crystal device. The monitor 21 displays, for instance, an operation screen, a monitoring screen, a warning screen to provide information to a user.

The touch panel 22 is a member operated by a user. The touch panel 22 may be provided overlapping with the monitor 21. The user interface of the occupant monitoring device 12 is formed by the monitor 21 and the touch panel 22.

The in-vehicle camera 23 is a member that captures an image in the passenger compartment. The in-vehicle camera 23 may capture the head of the driver, or may capture the passenger compartment in 360 degree overall directions.

As illustrated in FIG. 1, a main body 35 of the occupant monitoring device 12 is disposed at a central portion of the dashboard 5, thus the driver and an occupant sitting on the front passenger seat can view the display screen of the monitor 21 and operate the touch panel 22. Also, the in-vehicle camera 23 can capture the head of the driver from the front side.

The speaker 27 is a member that outputs voice into the passenger compartment. The speaker 27 may be connected to the main body 35 of the occupant monitoring device 12 via an audio cable, and may be provided in each door 3.

The seat vibration member 28 is a member that vibrates. The seat vibration member 28 is connected to the main body 35 of the occupant monitoring device 12 via a signal cable, and is provided in the seat 4 for the driver. It is to be noted that instead of the seat vibration member 28, a vibration member built in the steering wheel 6 may be provided.

The in-vehicle communication unit 29 is connected to the in-vehicle network 11. The in-vehicle communication unit 29 receives information necessary for the occupant monitoring device 12 as needed or periodically. In addition, the in-vehicle communication unit 29 transmits information on the occupant monitoring device 12 as needed or periodically. The in-vehicle communication unit 29 receives, for instance, information on the open/close state of each door 3, information on the speed of the automobile 1, and information on whether the automobile 1 is in a parking state.

The recorder 34 is a member that holds recorded data even when no power is supplied. The recorder 34 may be, for instance, a non-volatile memory. The recorder 34 holds, for instance, individual database 36, recognized occupant data 37, monitoring start setting data 38, and recognition start setting data 39.

FIG. 4 is an explanatory table of correspondence relationships between setting values of monitoring start setting data 38, setting values of recognition start setting data 39 of FIG. 3, and turn on/off states of the occupant monitoring device 12.

As illustrated in FIG. 4, when the monitoring start setting data 38 has a setting value of ON (occupant monitoring ON), inattentive driving detection function and drowsy driving detection function are enabled. The start controller 32 starts the occupant monitor 26. The occupant monitor 26 assumes a state which allows monitoring to be started.

On the other hand, when the monitoring start setting data 38 has a setting value of OFF (occupant monitoring OFF), inattentive driving detection function and drowsy driving detection function are disabled. The start controller 32 stops the occupant monitor 26. The occupant monitor 26 ends monitoring.

When the recognition start setting data 39 has a setting value of ON (individual recognition ON), individual recognition function is enabled. The start controller 32 starts the individual recognizer 33. The individual recognizer 33 assumes a state which allows authentication to be started.

On the other hand, when the recognition start setting data 39 has a setting value of OFF (individual recognition OFF), individual recognition function is disabled. The start controller 32 stops the individual recognizer 33. The individual recognizer 33 ends the authentication.

The start controller 32 individually controls start and stop of the occupant monitor 26 and the individual recognizer 33 according to an ON/OFF state of the in-vehicle network 11.

When the in-vehicle network 11 assumes an ON state, the start controller 32 individually starts the occupant monitor 26 and the individual recognizer 33 with the setting values of the monitoring start setting data 38 and the setting values of the recognition start setting data 39 at that point.

When the in-vehicle network 11 assumes an OFF state, the start controller 32 stops both the occupant monitor 26 and the individual recognizer 33.

It is to be noted that the start controller 32 may individually control start and stop of the occupant monitor 26 and the individual recognizer 33 according to an ON/OFF state of an ignition switch for starting the function of the automobile 1.

In this manner, in a setting state in which the occupant monitor 26 is stopped, the start controller 32 can start the individual recognizer 33 based on settings for starting the individual recognizer 33.

The occupant monitor 26 capable of starting to monitor performs monitoring processing basically during driving of the automobile 1 in order to secure the safety during the driving.

Also, when the vehicle is stopped and the necessity for occupant monitoring is low, the individual recognizer 33 performs individual recognition processing as needed.

FIG. 5 is an explanatory table for the data structure of the individual database 36 of FIG. 3. The individual database 36 stores the occupant information and the setting of multiple occupants who utilize the automobile 1.

In FIG. 5, the record, appearing in each row, of the individual database 36 corresponds to an occupant riding in the automobile 1. The record has, for instance, an individual ID, face data, a setting value to start monitoring, a setting value to start recognition, and individual setting data as occupant information.

The individual ID is an identification number issued for an occupant so that no overlap occurs between the identification numbers of registered occupants.

The face data is data obtained by capturing the faces of registered occupants.

The individual setting data is registered setting data for the automobile 1 for each registered occupant. The individual setting data has, for instance, a setting value of ON/OFF of the speaker 27, a setting value of ON/OFF of the vibration member, and a setting value of an occupant position such as the seat 4 and the steering wheel 6.

The individual setting data buffer 30 stores the individual IDs and the setting data of recognized occupants. The setting data is utilized by the occupant monitor 26. Part of the individual IDs or the setting data is transmitted to other electronic devices by the in-vehicle communication unit 29.

The other electronic devices perform various types of individual setting control based on the received individual IDs or setting data. For instance, the position setting device 16 adjusts the fore-and-aft and vertical position of the seat 4 and the angle of the backrest based on the received setting data or setting data recorded in the position setting device 16, corresponding to the received individual IDs.

When the setting value of the recognition start setting data 39 is ON setting which allows authentication to be started, the individual recognizer 33 performs individual recognition processing to recognize each occupant riding in the automobile 1 when the automobile 1 is stopped.

Although the details of the individual recognition processing will be described later, the individual recognizer 33 compares the images of the faces of the occupants captured by the in-vehicle camera 23 with multiple pieces of face data registered in the individual database 36.

When face data is obtained in which a predetermined matching value is available, the individual recognizer 33 updates the recognized occupant data 37 with an individual ID which is registered in the individual database 36 and corresponds to the face data with a highest matching value.

When face data is not obtained in which a predetermined matching value is achieved, the individual recognizer 33 updates the recognized occupant data 37 with a guest ID as the guest information.

Thus, the individual ID or the guest ID corresponding to each occupant riding in the automobile 1 is registered in the recognized occupant data 37.

The setting updater 31 updates the monitoring start setting data 38, the recognition start setting data 39, and the setting values of the individual setting data buffer 30 based on an operation of the touch panel 22.

The setting updater 31 adds a record to, deletes a record from, updates the individual database 36 using the monitoring start setting data 38, the recognition start setting data 39, and the setting values of the individual setting data buffer 30 based on an operation of the touch panel 22.

When the occupant monitor 26 assumes a state which allows monitoring to be started or when the recognized occupant data 37 is updated during monitoring, the setting updater 31 reads records in the individual database 36, which correspond to the individual IDs of the recognized occupant data 37, and updates the monitoring start setting data 38, the recognition start setting data 39, and the individual setting data buffer 30 using the setting values included in the records. The monitoring start setting data 38, the recognition start setting data 39, and the individual setting data buffer 30 store the setting of each occupant stored in the recognized occupant data 37. The monitoring start setting data 38 stores a setting value for starting or stopping the occupant monitor 26. The recognition start setting data 39 stores a setting value for starting or stopping the individual recognizer 33.

Thus, in a setting state in which the occupant monitor 26 is started, the setting updater 31 updates the setting data of the individual setting data buffer 30 according to a result of authentication of an occupant performed by the individual recognizer 33, and in a setting state in which the occupant monitor 26 is stopped, the setting updater 31 does not update the setting data of the individual setting data buffer 30. Also, the individual setting data buffer 30 records the setting data corresponding to the occupants recognized by the individual recognizer 33.

When the occupant monitor 26 ends monitoring, the setting updater 31 updates the individual database 36 with the setting values of the monitoring start setting data 38, the recognition start setting data 39, and the individual setting data buffer 30.

When an OFF operation of the ignition switch of the automobile 1 is performed, the occupant monitor 26 updates the individual database 36 with the data at that point. Save processing for the buffer is performed.

It is to be noted that the occupant monitor 26 may update the individual database 36 with the setting values of the monitoring start setting data 38, the recognition start setting data 39, and the individual setting data buffer 30 as needed when appropriate. By the update, all the setting values of the individual database 36 may be the updated or part of the setting values of the individual database 36 may be the updated. For instance, the occupant monitor 26 may register setting values to be used by the occupant monitoring device 12 at the same time when an individual ID is registered in the individual database 36, and at the time of a subsequent ignition off operation, may register setting values of other devices, such as a temperature of the air-conditioner (not illustrated) of the automobile 1, in the individual database 36.

The occupant monitor 26 has the monitor 24 and the handling unit 25.

When the setting value of the monitoring start setting data 38 is ON setting which allows authentication to be started, the monitor 24 performs monitoring processing to monitor each occupant riding in the automobile 1 mainly during driving of the automobile 1 according to a result of recognition of the occupants by the individual recognizer 33.

In the monitoring processing, the monitor 24 determines whether the image of the face of an occupant captured by the in-vehicle camera 23 is in a state corresponding to a predetermined state of a target to be monitored, based on face data updated and set in the individual setting data buffer 30.

For instance, when an occupant is to be monitored for inattentive driving, the monitor 24 determines whether a state, in which the orientation of the face in the captured image deviates from the forward traveling direction, continues for a predetermined time or longer.

Also, when an occupant is to be monitored for drowsy driving, the monitor 24 determines whether a state has occurred, in which the eyes in the captured image are closed a predetermined number of times or greater or for a predetermined time or longer.

When an individual ID is not registered in the recognized occupant data 37, the monitor 24 may determine whether the image of the face of an occupant captured by the in-vehicle camera 23 is in a state corresponding to a predetermined state of a target to be monitored, based on generalized standard face data.

When it is determined by the monitor 24 that a warning state has occurred, the handling unit 25 performs warning processing.

In the warning processing, the handling unit 25 checks the setting values of the individual setting data buffer 30. When a setting value for turning on the speaker 27 is present, the handling unit 25 outputs warning sound from the speaker 27 for a certain period. When a setting value for turning on the vibration member is present, the handling unit 25 vibrates the seat vibration member 28 for a certain period. In addition, the handling unit 25 checks the setting values of the individual setting data buffer 30, and when a setting value for turning on the display is present, the handling unit 25 displays warning on the monitor 21.

In this manner, the occupant monitor 26 of the occupant monitoring device 12 monitors each occupant riding in the automobile 1 based on the setting of the individual setting data buffer 30, and can output warning through display or sound as needed.

In a setting state in which the occupant monitor 26 is started and in a setting state in which the occupant monitor 26 is stopped, the in-vehicle communication unit 29 transmits the setting data of recognized occupants, set in the individual setting data buffer 30 to other electronic devices provided in the automobile 1.

The in-vehicle communication unit 29 may periodically transmit the setting data to other electronic devices in a repetitive manner.

Figure 6:
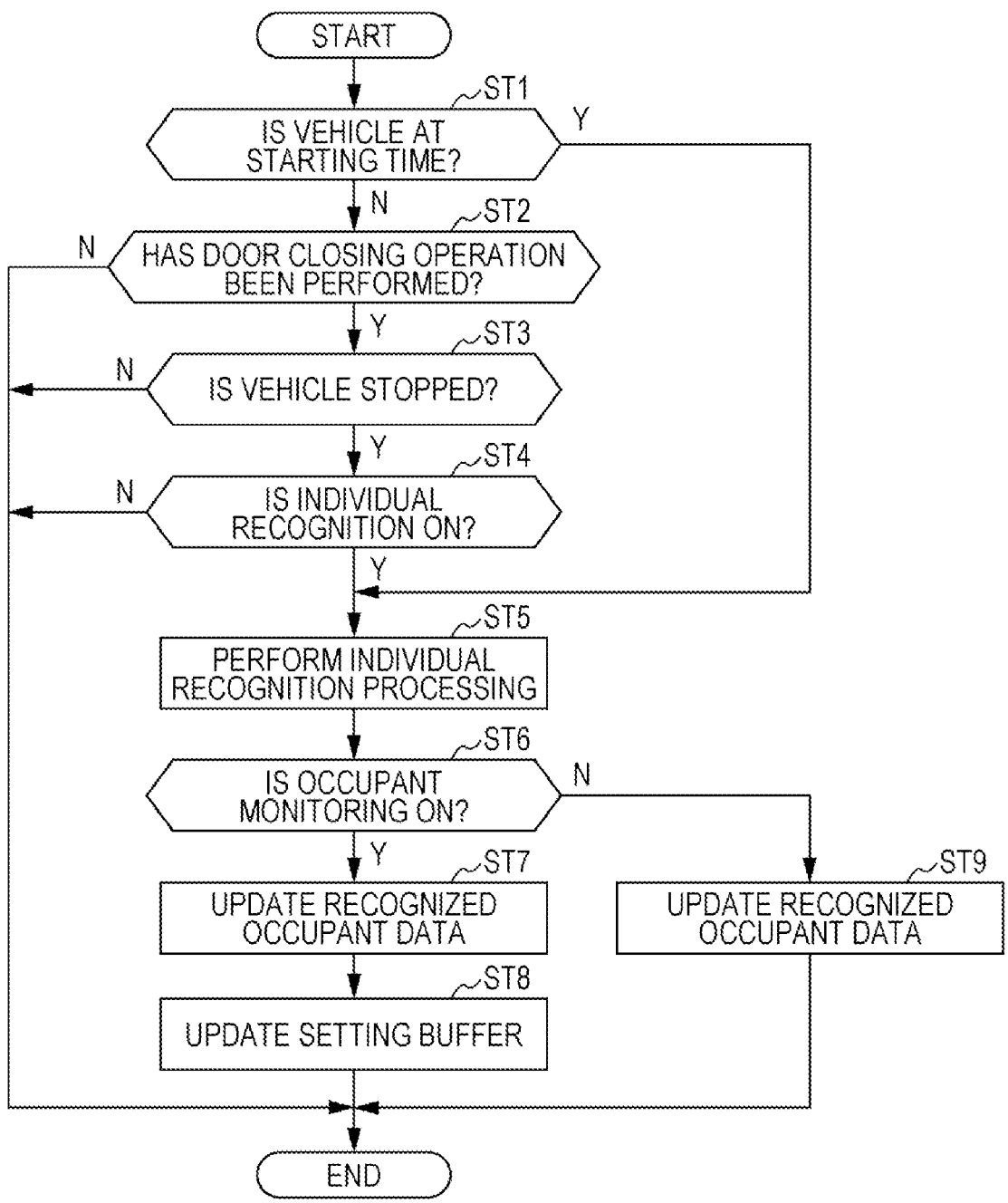
FIG. 6 is a flowchart illustrating the flow of occupant recognition processing performed by the occupant monitoring device of FIG. 2.

FIG. 6 is a flowchart illustrating the flow of an example of occupant recognition processing performed by the occupant monitoring device 12 of FIG. 2.

The start controller 32 of the occupant monitoring device 12 periodically performs the processing of FIG. 6 in a repetitive manner. The start controller 32 performs the processing of FIG. 6, for instance, by a start instruction of the start controller 32.

In the occupant recognition processing of FIG. 6, the start controller 32 first determines whether it is the starting time of the automobile 1 (step ST1). The start controller 32 may determine whether it is the starting time of the automobile 1, for instance, based on whether the lapse of time since an ON operation of the ignition switch of the automobile 1 is within a predetermined period. When it is the starting time of the automobile 1, the individual recognizer 33 performs the individual recognition processing in step ST5 regardless of starting or stopping of the occupant monitor 26.

When a predetermined period has elapsed since start of the automobile 1, the start controller 32 determines that it is not the starting time, and determines whether a close operation is performed on any door 3 (step ST2). The individual recognizer 33 may determine whether a close operation is performed on any door 3, based on a detection value of the door open/close sensor 13, received by the in-vehicle communication unit 29, for instance. When an occupant rides on the automobile 1, the occupant opens a door 3, and closes the door 3 with seated on the seat 4. Riding of an occupant in the automobile 1 can be detected by a detection value of the door open/close sensor 13. The start controller 32 may determine that an open operation is performed on the door 3, and open and close operations are performed on the door 3. When a close operation is not performed on any door 3, the start controller 32 ends the processing of FIG. 6.

When a close operation is performed on any door 3, the start controller 32 determines whether the automobile 1 is stopped (step ST3). The start controller 32 may determine that the automobile 1 is stopped based on that a detection speed of the vehicle speed sensor 14, received by the in-vehicle communication unit 29, is 0 kilometers per hour. When the automobile 1 is not stopping, the start controller 32 ends the processing of FIG. 6.

When the automobile 1 is stopped, the start controller 32 determines whether the setting of the individual recognition is ON based on the recognition start setting data 39 (step ST4). When the setting of the individual recognition is not ON, the start controller 32 ends the processing of FIG. 6.

When the setting of the individual recognition is ON or the current time is determined to be the starting time in step ST1, the start controller 32 instructs the individual recognizer 33 to perform individual recognition processing (step ST5).

Figure 7:
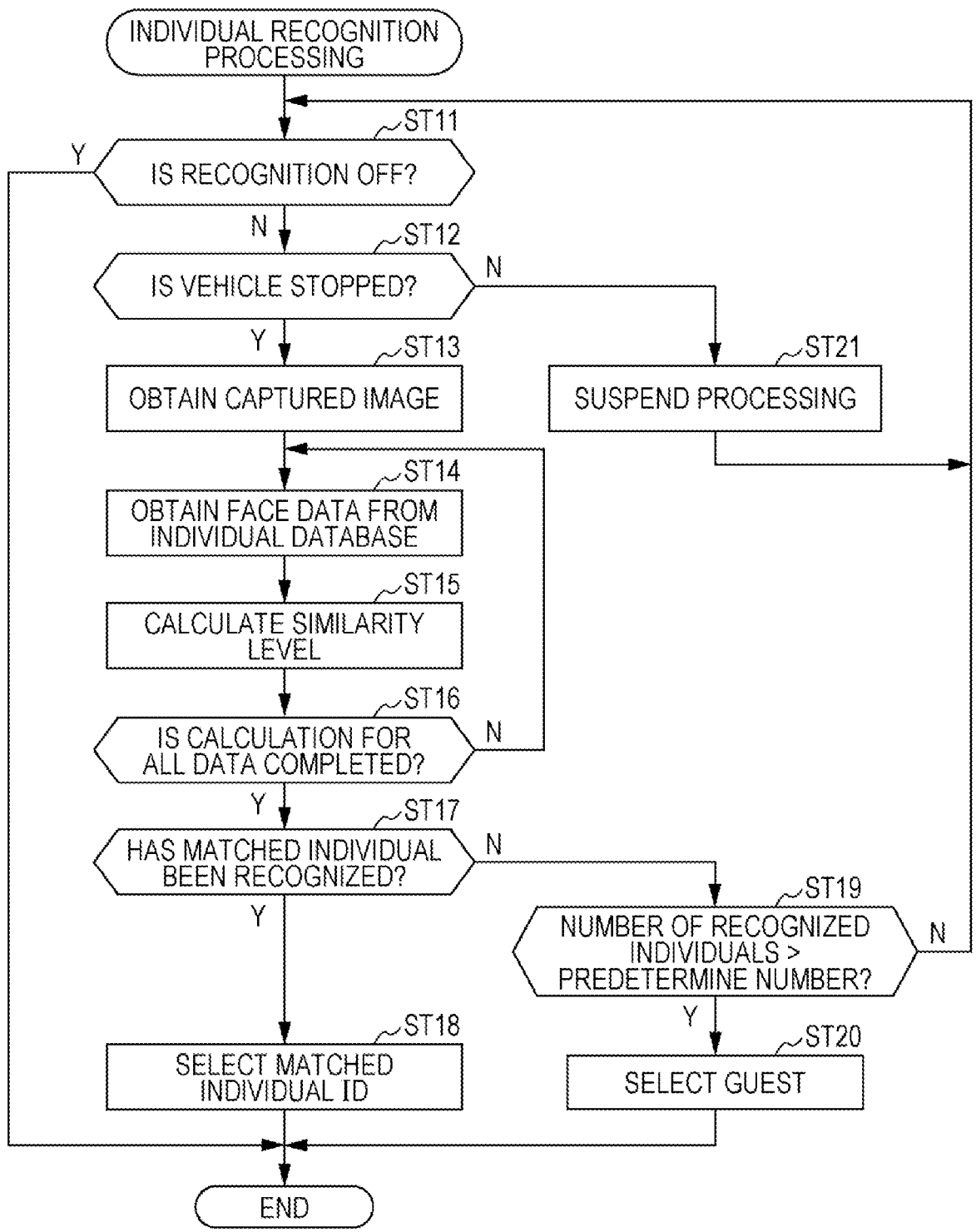
FIG. 7 is a flowchart illustrating an example of detailed processing of the individual recognition processing of FIG. 6.

FIG. 7 is a flowchart illustrating an example of detailed processing of the individual recognition processing of FIG. 6.

In the individual recognition processing of FIG. 7, the individual recognizer 33 determines whether the individual recognition is set OFF based on the recognition start setting data 39 (step ST11). When the individual recognition is set OFF, the start controller 32 ends the individual recognition processing of FIG. 7.

The individual recognizer 33 performs the individual recognition processing of FIG. 7 regardless of the setting of the monitoring start setting data 38. Even when the occupant monitor 26 is stopped, the individual recognizer 33 can perform the individual recognition processing.

When the individual recognition is not set OFF, the individual recognizer 33 determines whether the automobile 1 is stopped (step ST12). When the automobile 1 is not stopped, in other words, driving, the individual recognizer 33 suspends the processing (step ST21), and the processing is returned to step ST11.

When the automobile 1 is stopped, the individual recognizer 33 obtains the image of the face of an occupant, captured by the in-vehicle camera 23 (step ST13).

Subsequently, the individual recognizer 33 obtains the first face data registered in the individual database 36 (step ST14), and determines a similarity level of the face data (step ST15).

After determining a similarity level for one piece of face data, the individual recognizer 33 determines whether comparison processing with all face data registered in the individual database 36 is completed (step ST16). When the comparison processing with all face data is not completed, the individual recognizer 33 returns the processing to step ST14, and determines a similarity level of the next face data. The individual recognizer 33 repeats the above processing until comparison processing with all face data registered in the individual database 36 is completed.

When the comparison processing with all face data is completed, the individual recognizer 33 determines whether face data with a matching rate of a predetermined value or greater is present (step ST17). When face data with the matching rate is present, the individual recognizer 33 selects an individual ID from the individual database 36, the individual ID corresponding to face data with a matching rate of a maximum value (step ST18). The individual recognizer 33 ends the individual recognition processing of FIG. 7.

When face data with a matching rate of a predetermined value or greater is not present, the individual recognizer 33 determines whether repeats the recognition processing a predetermined number of times (step ST19).

When the recognition processing is not repeated a predetermined number of times, the individual recognizer 33 returns the processing to step ST11, and performs matching determination for the next captured image.

When the recognition processing is repeated a predetermined number of times, the individual recognizer 33 selects a guest ID (step ST20), and ends the individual recognition processing of FIG. 7.

In this manner, the individual recognizer 33 repeats matching determination for a predetermined number of multiple images captured with time intervals, and recognize each occupant riding in the automobile. Consequently, occupant recognition performance can be improved.

When an occupant is still not identifiable, the individual recognizer 33 recognizes that an unregistered guest is riding in the automobile.

When an individual ID or a guest ID is selected or the individual recognition is set OFF, the individual recognizer 33 ends the individual recognition processing.

Also, when driving of the automobile 1 is started before the individual recognition processing is completed, the individual recognizer 33 suspends the recognition processing according to the determination in step ST12. Thus, the occupant monitor 26 can monitor each occupant during driving of the automobile 1 without being interfered with the individual recognition processing.

When the automobile 1 is subsequently stopped, the individual recognizer 33 can resume the recognition processing which has been suspended according to the determination in step ST12.

Also, when the setting value of the recognition start setting data 39 is changed to individual recognition OFF by an operation of an occupant before the individual recognition processing is completed, the individual recognizer 33 ends the individual recognition processing in operation.

As illustrated in FIG. 6, when the individual recognition processing is ended, the individual recognizer 33 determines whether the setting of occupant monitoring is ON based on the monitoring start setting data 38 (step ST6).

When the setting of occupant monitoring is ON, the individual recognizer 33 updates the recognized occupant data 37 with a registered individual ID corresponding to face data determined to be matched (step ST7). When an individual is not identifiable at the end of the individual recognition processing, the individual recognizer 33 updates the recognized occupant data 37 using a guest ID which does not identify an occupant.

Subsequently, the setting updater 31 reads setting data, from the individual database 36, which corresponds to an individual ID registered in the recognized occupant data 37, and updates the individual setting data buffer 30 (step ST8). Thus, the setting data of a recognized occupant is registered in the individual setting data buffer 30. The occupant monitor 26 can start the occupant monitoring based on the setting value of the updated individual setting data buffer 30.

When the setting of occupant monitoring is OFF, the individual recognizer 33 updates the recognized occupant data 37 with a registered individual ID corresponding to face data determined to be matched (step ST9). When an individual is not identifiable at the end of the individual recognition processing, the individual recognizer 33 updates the recognized occupant data 37 using a guest ID which does not identify an occupant. In this case, the setting updater 31 does not update the individual setting data buffer 30, and ends the processing of FIG. 6. The occupant monitor 26 can continue the occupant monitoring based on the setting value previously registered in the individual setting data buffer 30.

Figure 8:
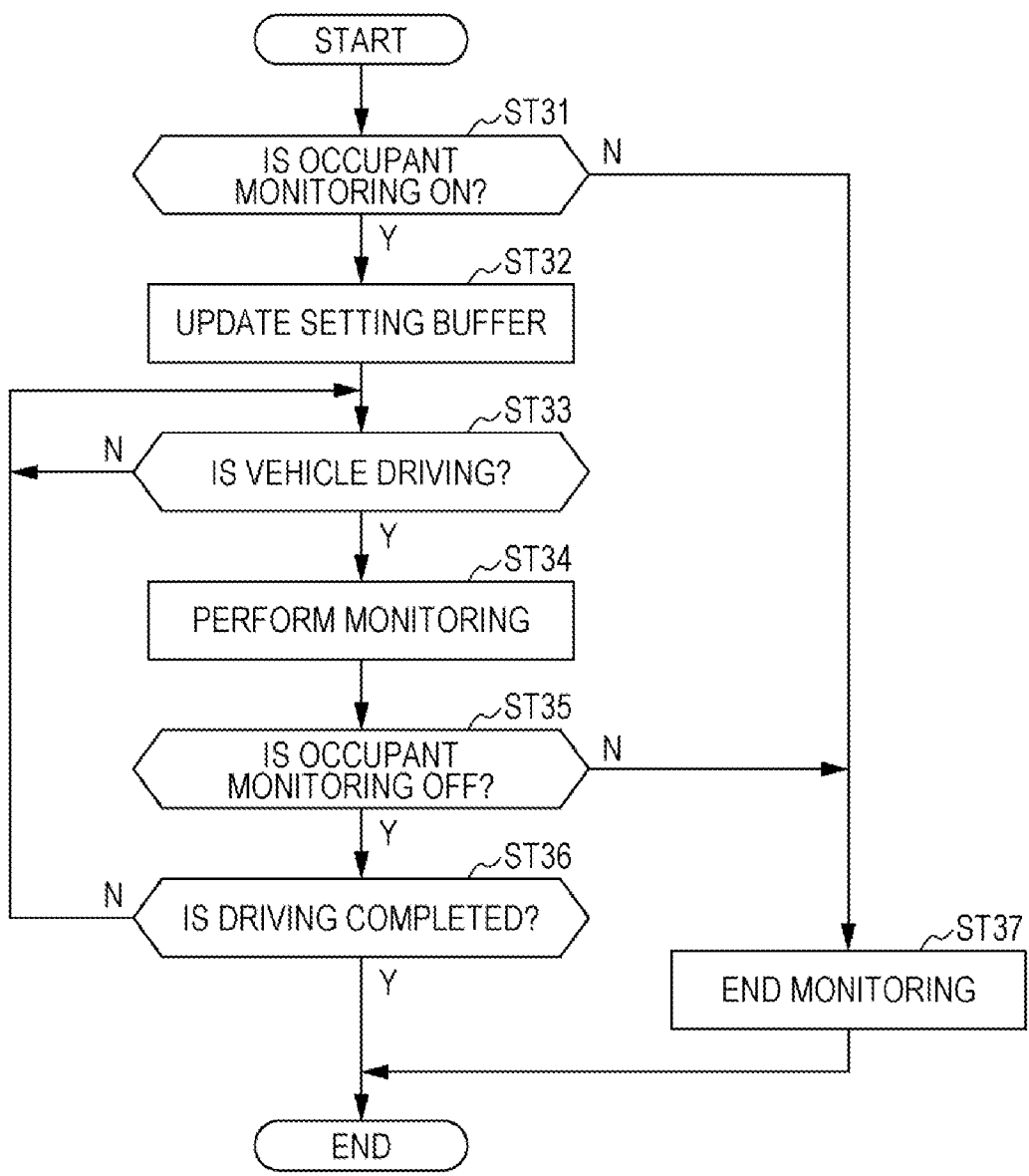
FIG. 8 is a flowchart illustrating the flow of monitoring start processing performed by the occupant monitoring device of FIG. 2.

FIG. 8 is a flowchart illustrating the flow of monitoring start processing performed by the occupant monitoring device 12 of FIG. 2.

The occupant monitor 26 of the occupant monitoring device 12 periodically performs the processing of FIG. 8 in a repetitive manner. The occupant monitor 26 performs the processing of FIG. 6, for instance, by a start instruction of the start controller 32.

In the occupant monitoring processing of FIG. 8, the occupant monitor 26 determines whether the setting of occupant monitoring is ON based on the monitoring start setting data 38 (step ST31).

When the setting of occupant monitoring is not ON, the occupant monitor 26 ends the monitoring (step ST37), and ends the occupant monitoring processing of FIG. 8.

When the setting of occupant monitoring is ON, the setting updater 31 reads setting data from the individual database 36 based on the instruction of the occupant monitor 26, the setting data corresponding to an individual ID registered in the recognized occupant data 37, and updates the individual setting data buffer 30 (step ST32). Thus, the setting data of the most recently recognized occupant is registered in the individual setting data buffer 30.

After the individual setting data buffer 30 is updated, the occupant monitor 26 determines whether the automobile 1 is driving (step ST33).

When the automobile 1 is not driving, the occupant monitor 26 repeats checking of driving in step ST33.

When the automobile 1 is driving, the occupant monitor 26 start monitoring (step ST34). The occupant monitor 26 reads the setting value used to control the monitoring from the individual setting data buffer 30, and performs monitoring according to the setting.

When the setting value of the individual setting data buffer 30 is updated by the processing in step ST7 of FIG. 6 during the monitoring, the occupant monitor 26 continues the monitoring with the updated setting.

During the monitoring, the occupant monitor 26 determines whether the setting of occupant monitoring is changed to OFF based on the monitoring start setting data 38 (step ST35). When the setting of occupant monitoring is changed to OFF, the occupant monitor 26 ends the monitoring (step ST37), and ends the occupant monitoring processing of FIG. 8.

When the setting of occupant monitoring is not changed to OFF during the monitoring, the occupant monitor 26 further ends monitoring for determining whether driving has ended (step ST36).

When the driving has not ended, the occupant monitor 26 returns the processing to step ST33, and continues the occupant monitoring.

When the driving has ended, the occupant monitor 26 ends the occupant monitoring processing of FIG. 8.

Figure 9:
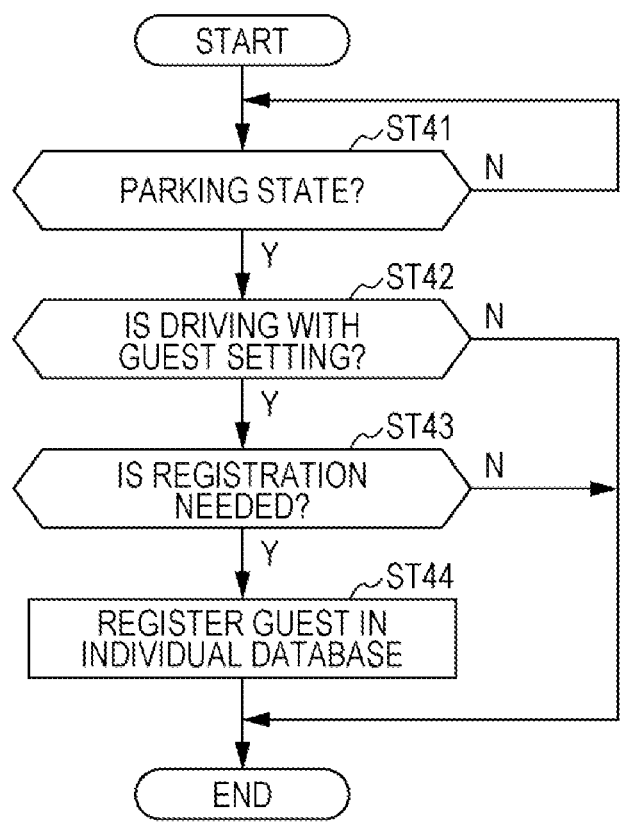
FIG. 9 is a flowchart illustrating the flow of an example of new registration processing performed when an occupant gets out of a vehicle.

FIG. 9 is a flowchart illustrating the flow of an example of new registration processing performed when an occupant gets out of an automobile.

The setting updater 31 of the occupant monitoring device 12 of FIG. 2 performs the processing of FIG. 9 when an occupant gets out of an automobile.

In the new registration processing of FIG. 9, the setting updater 31 determines whether the automobile 1 is in a parking state by the park sensor 15 (step ST41).

The park sensor 15 detects a parking state, for instance, by an operation of the shift lever to a parking position or pulling of the parking lever.

In addition, the setting updater 31 may determine whether an operation for getting out of the automobile 1 is performed by determining whether the door lock is released.

When the automobile 1 is not in a parking state, the setting updater 31 repeats the determination in step ST41.

When the automobile 1 is in a parking state, the setting updater 31 determines whether the automobile 1 has run with guest setting (step ST42).

The setting updater 31 only needs to determine whether a guest ID is registered in the recognized occupant data 37 or the individual setting data buffer 30. The setting updater 31 may further determine whether monitoring of the monitoring start setting data 38 is ON. When a guest ID is registered or monitoring is further ON, the setting updater 31 determines that the automobile 1 has run with guest setting.

When the automobile 1 has not run with guest setting, the setting updater 31 ends the new registration processing of FIG. 9.

When the automobile 1 runs with guest setting, the setting updater 31 determines the necessity of registration (step ST43). The setting updater 31 displays a registration confirmation screen for a guest riding in the automobile 1 on the monitor 21. Various setting values of the individual setting data buffer 30 may be displayed on the registration confirmation screen.

When a selection operation for registration is performed on the touch panel 22, the setting updater 31 determines that registration is necessary, adds the image data of the face of an occupant captured by the in-vehicle camera 23, and a new unused individual ID to the various setting values of the individual setting data buffer 30, and registers the various setting values in the individual database 36 (step ST44). Consequently, a record of a new occupant riding in the automobile 1 is added to the individual database 36.

When a selection operation for registration is not performed on the touch panel 22, the setting updater 31 determines that registration is not necessary, and ends the new registration processing of FIG. 9.

Figure 10:
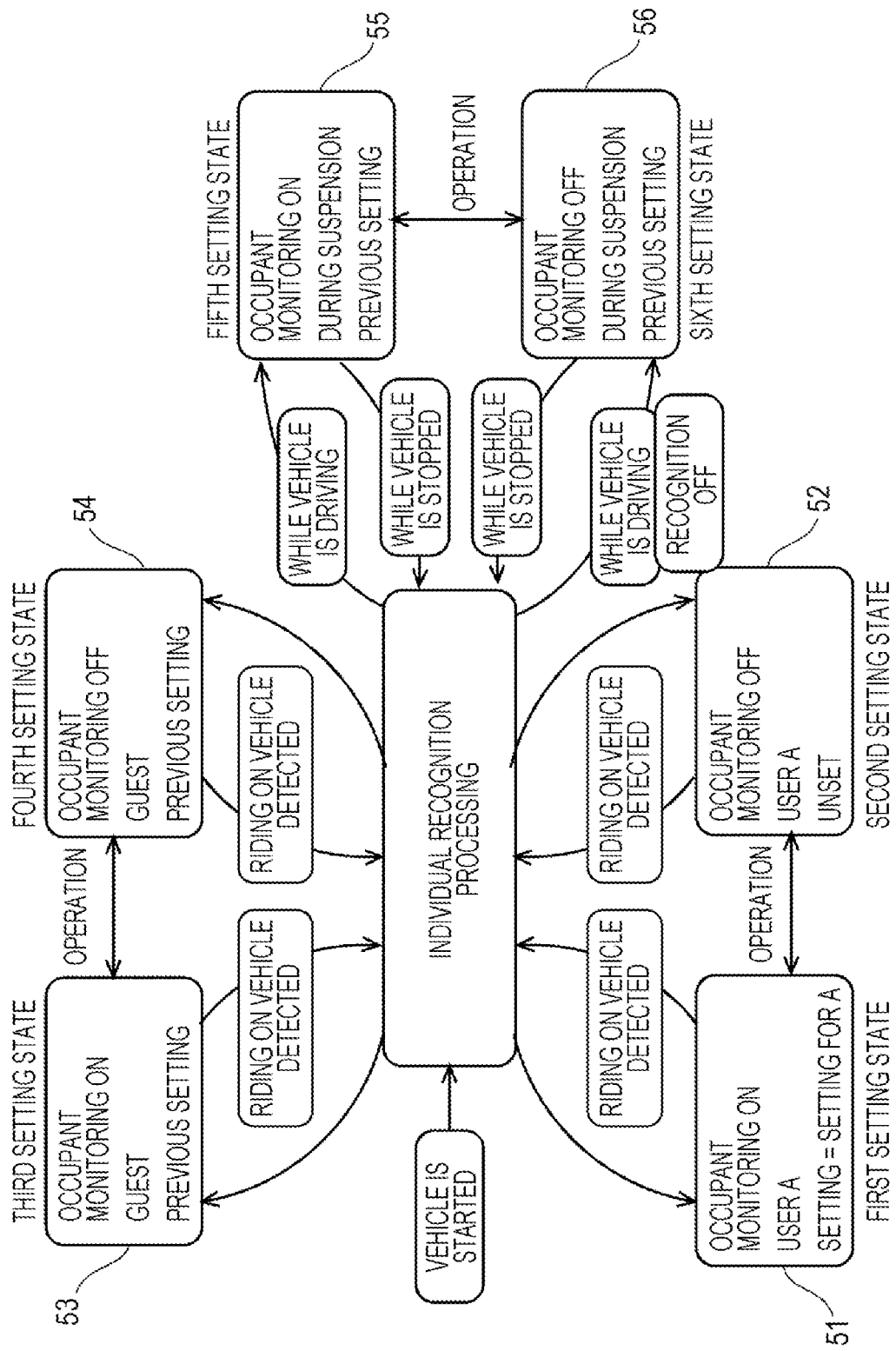
FIG. 10 is an explanatory diagram of transition of setting states in the occupant monitoring device of FIG. 2.

FIG. 10 is an explanatory diagram of transition of setting states in the occupant monitoring device 12 of FIG. 2. In FIG. 10, it is basically assumed that the setting of individual recognition is ON.

As illustrated in FIG. 10, when the automobile 1 is started, individual recognition processing may be performed. Each occupant riding in the automobile 1 is recognized by the individual recognition processing.

When a recognized occupant is registered in the individual database 36, the setting state of the occupant monitoring device 12 becomes a first setting state 51 or a second setting state 52.

The first setting state 51 is for the situation where the setting of occupant monitoring is ON. In this case, registered user A is authenticated, and the setting value of user A is set to the individual setting data buffer 30 for occupant monitoring. In this case, the occupant monitoring device 12 identifies each occupant riding in the automobile 1, and monitors the occupant.

The second setting state 52 is for the situation where the setting of occupant monitoring is OFF. In this case, user A is authenticated, but the setting value of user A is not set to the individual setting data buffer 30. The first setting state 51 is then assumed, and the setting value of user A is set. However, when an operation is performed subsequently to set occupant monitoring OFF and transition is made from the first setting state 51, the setting value of user A is set to the individual setting data buffer 30.

When riding in the automobile 1 is detected, each occupant is authenticated again in a new riding state by individual recognition processing.

For instance, when user B registered in the individual database 36 is recognized, the setting state of the occupant monitoring device 12 becomes the first setting state 51 or the second setting state 52 for user B.

However, when user C unregistered in the individual database 36 is recognized, the setting state of the occupant monitoring device 12 becomes a third setting state 53 or a fourth setting state 54 for a guest.

The third setting state 53 is for the situation where the setting of occupant monitoring is ON. In this case, since user C is unregistered, no setting is made for the user, and the individual setting data buffer 30 is not updated, either. The previous setting data not associated with user C remains registered in the individual setting data buffer 30. In this case, the occupant monitoring device 12 monitors each occupant riding in the automobile 1 with the occupant unidentified. Subsequently, when an operation is performed to set occupant monitoring OFF, the fourth setting state 54 is assumed.

It is to be noted that guest setting may be stored in the individual database 36 in association with a guest ID. In this case, the individual setting data buffer 30 in the third setting state 53 is updated to the guest setting.

The fourth setting state 54 is for the situation where the setting of occupant monitoring is OFF. Also in this case, since user C is not registered, guest setting is made, and the individual setting data buffer 30 is not updated, either. Subsequently, when an operation is performed to set occupant monitoring ON, the third setting state 53 is assumed.

In this manner, the setting state of the occupant monitoring device 12 makes transition to a different setting state according to ON/OFF setting of occupant monitoring and a result of individual recognition.

However, even when a user is unknown, the guest setting is made, and unsetting of the user does not occur. Monitoring can be started or continued with the guest setting. It is possible to avoid occurrence of a situation in which monitoring is not possible due to unsetting of a user.

When driving of the automobile 1 is started and the occupant recognition processing is suspended, the setting state of the occupant monitoring device 12 becomes a fifth setting state 55 or a sixth setting state 56.

The fifth setting state 55 is for the situation where the setting of occupant monitoring is ON. In this case, the recognition processing is suspended. The individual setting data buffer 30 is not updated, and the previous setting data remains registered. Subsequently, when an operation is performed to set occupant monitoring OFF, the sixth setting state 56 is assumed. When the occupant monitoring is set ON again while the automobile 1 is stopped, the suspended occupant recognition processing is resumed.

The sixth setting state 56 is for the situation where the setting of occupant monitoring is OFF. Also, in this case, the recognition processing is suspended. The individual setting data buffer 30 is not updated, and the previous setting data remains registered. Subsequently, when an operation is performed to set occupant monitoring ON, the fifth setting state 55 is assumed. When the occupant monitoring is set ON again while the automobile 1 is stopped, the suspended occupant recognition processing is resumed.

When the setting of individual recognition is changed to OFF during the occupant recognition processing, the setting state of the occupant monitoring device 12 becomes the fifth setting state 55 or the sixth setting state 56.

As described above, in the example, when an occupant is not identifiable even if the individual recognizer 33 finishes the recognition processing, the recognized occupant data 37 stores guest information which does not identify the occupant, and the occupant monitor 26 can monitor the guest riding in the automobile 1 based on the previous setting or the setting for a guest held in the individual setting data buffer 30.

Thus, even when an occupant is not identifiable, the occupant monitoring device 12 can start monitoring of the guest riding in the automobile 1 without waiting for an operation of the occupant. Consequently, even when setting is not stored in the occupant monitoring device 12 by a registering operation, the occupant recognized as a guest can start driving of the automobile 1 while being monitored by the occupant monitoring device 12 based on the setting held in the individual setting data buffer 30 provided separately from the recognized occupant data 37. An unregistered occupant, such as an occupant who thinks monitoring is unnecessary, can start driving of the automobile 1 and can be monitored as needed without performing a registration operation for the occupant on the occupant monitoring device 12.

In addition, even when a recognized occupant is changed between a registered occupant and an unregistered occupant, the individual setting data buffer 30, the monitoring start setting data 38, and the recognition start setting data 39 hold the previous setting value. Therefore, the state of the monitoring function can be always maintained at the set state, and when monitoring is needed, the monitoring state can be continued. The same goes with when the individual recognition processing is suspended.

In the example, even when the monitoring start setting data 38 stores setting for stopping the occupant monitor 26, the individual recognizer 33 can recognize each occupant riding in the automobile 1.

Thus, even in the state where the occupant monitor 26 is stopped to stop the monitoring function of the occupant monitoring device 12, each occupant riding in the automobile 1 can be recognized. It is possible to recognize each occupant who has ridden in the automobile 1 when the occupant monitor 26 is stopped, and monitoring can be switched to the occupant. The setting for monitoring an occupant by the occupant monitor 26 can be switched between the setting for a guest and the setting for a specific occupant, for instance. In addition, even when an occupant is replaced by another occupant while the occupant monitor 26 is stopped, the replacing occupant can be recognized. The replacing occupant can be monitored by starting monitoring subsequently with the setting for the occupant.

In the example, when a guest ID is registered in the recognized occupant data 37, the setting updater 31 adds an individual ID to the setting stored in the individual setting data buffer 30, and registers the individual ID in the individual database 36.

Therefore, it is possible for an occupant to register the setting for the occupant in the individual database 36 without performing an operation for setting the individual setting data buffer 30.

Particularly when an operation for getting in or out of the automobile 1, for instance, an operation of the shift lever to a parking position is detected, after confirmation of an occupant for registration is made, the setting stored in the individual setting data buffer 30 is registered in the individual database 36, thus the setting for the occupant can be registered in the individual database 36 as needed without forcing the occupant to perform all the individual setting operations.

In the example, when an individual ID of the recognized occupant data 37 is updated in the setting for starting the occupant monitor 26, the setting value of the individual setting data buffer 30 is updated using the setting registered in the individual database 36 in association with the individual ID. Therefore, the occupant monitor 26 can start monitoring an occupant using the setting for the occupant recognized last by the individual recognizer 33.

In the example, even when the recognition processing of the individual recognizer 33 is not completed during driving of the automobile 1, the recognition processing is suspended, and occupant monitoring by the occupant monitor 26 is enabled. In addition, when the automobile 1 is stopped again after being started, the suspended recognition processing can be resumed to complete the recognition processing.

In the example, when the individual recognizer 33 is stopped during recognition processing, the individual recognizer 33 ends the recognition processing during processing. Thus, when an occupant considers the recognition processing as unnecessary, unnecessary recognition processing may not be performed.

Although the example above is an instance of a preferred example of the present invention, the present invention is not limited to this, and various modification or changes may be made in the scope without departing from the spirit of the invention.

For instance, in the example, riding of an occupant in the automobile 1 is detected by a close operation performed on a door 3. In addition, for instance, riding of an occupant in the automobile 1 may be detected by an open operation performed on a door 3. Also, riding of an occupant in the automobile 1 may be detected by occupant detection using a seat sensor for the seat 4.

The invention claimed is:

1. An occupant monitoring device for a vehicle, the occupant monitoring device being mountable in the vehicle, the occupant monitoring device comprising:
    a recognizer configured to recognize one or more occupants riding in the vehicle;
    a recognized occupant storage configured to store occupant information of the one or more occupants recognized by the recognizer;
    a setting storage configured to store setting value for the one or more occupants recognized by the recognizer and whose occupant information is stored in the recognized occupant storage; and
    a monitor configured to monitor the one or more occupants riding in the vehicle on a basis of the setting value for the one or more occupants recognized by the recognizer and whose occupant information is stored in the setting storage, wherein
        when the recognizer is unable to identify an occupant by recognition processing, the recognized occupant storage is further configured to store guest information for the occupant unidentifiable by the recognizer, wherein
        the guest information does not identify the occupant, and
        settings for the occupant unidentifiable by the recognizer are unregistered with a database that stores occupant information and settings corresponding to multiple occupants who utilize the vehicle,
    the monitor is further configured to monitor the occupant unidentifiable by the recognizer who has ridden in the vehicle, wherein the occupant unidentifiable by the recognizer is monitored on the basis of one of a guest setting stored in the setting storage or a previous setting value stored in the setting storage, and
    when the vehicle has run with the guest information stored in the recognized occupant storage for the occupant who is unidentifiable by the recognizer and whose settings are unregistered with the database, a registration processing to register the settings for the occupant unidentifiable by the recognizer is performed after the vehicle has stopped.

2. The occupant monitoring device for the vehicle according to claim 1, wherein
    the setting storage is further configured to store setting for starting or stopping the monitor, and even when the monitor is stopped, the recognizer is further configured to recognize the one or more occupants riding in the vehicle.

3. The occupant monitoring device for the vehicle according to claim 2, further comprising:
the database configured to store the occupant information and the settings corresponding to the multiple occupants who utilize the vehicle; and
a register, wherein
when the guest information is registered in the recognized occupant storage, the register is configured to:
add a new occupant information to the settings for the occupant unidentifiable by the recognizer stored in the setting storage, and
register the settings for the occupant unidentifiable by the recognizer in the database.

4. The occupant monitoring device for the vehicle according to claim 3, further comprising a detector configured to detect an operation for getting in or out of the vehicle,
wherein when the operation for getting in or out of the vehicle is detected by the detector and the guest information is registered in the recognized occupant storage, the register is configured to:
add the new occupant information to the settings for the occupant unidentifiable by the recognizer stored in the setting storage, and
register the settings for the occupant unidentifiable by the recognizer in the database.

5. The occupant monitoring device for the vehicle according to claim 4, wherein the detector is further configured to detect an operation of a shift lever of the vehicle to a parking position.

6. The occupant monitoring device for the vehicle according to claim 3, wherein
the monitor is further configured to monitor the one or more occupants while the vehicle is driven,
the recognizer is further configured to recognize the one or more occupants while the vehicle is stopped,
when driving of the vehicle is started before the recognition processing by the recognizer is completed, the recognizer is further configured to suspend the recognition processing, and the monitor is further configured to monitor the one or more occupants riding in the vehicle, and
when the vehicle is stopped subsequently, the recognizer is further configured to resume the suspended recognition processing.

7. The occupant monitoring device for the vehicle according to claim 6, wherein
the setting storage is further configured to store setting for starting or stopping the recognizer, and
when the recognizer is stopped during the recognition processing, the recognizer is further configured to suspend the recognition processing.

8. The occupant monitoring device for the vehicle according to claim 2, wherein
the monitor is further configured to monitor the one or more occupants while the vehicle is driven,
the recognizer is further configured to recognize the one or more occupants while the vehicle is stopped,
when driving of the vehicle is started before the recognition processing by the recognizer is completed, the recognizer is further configured to suspend the recognition processing, and the monitor is further configured to monitor the one or more occupants riding in the vehicle, and
when the vehicle is stopped subsequently, the recognizer is further configured to resume the suspended recognition processing.

9. The occupant monitoring device for the vehicle according to claim 8, wherein
the setting storage is further configured to store setting for starting or stopping the recognizer, and
when the recognizer is stopped during the recognition processing, the recognizer is further configured to suspend the recognition processing.

10. The occupant monitoring device for the vehicle according to claim 1, further comprising:
the database configured to store the occupant information and the settings corresponding to the multiple occupants who utilize the vehicle; and
a register, wherein
when the guest information is registered in the recognized occupant storage, the register is configured to:
add a new occupant information to the settings for the occupant unidentifiable by the recognizer stored in the setting storage, and
register the settings for the occupant unidentifiable by the recognizer in the database.

11. The occupant monitoring device for the vehicle according to claim 10, further comprising a detector configured to detect an operation for getting in or out of the vehicle,
wherein when the operation for getting in or out of the vehicle is detected by the detector and the guest information is registered in the recognized occupant storage, the register is configured to:
add the new occupant information to the settings for the occupant unidentifiable by the recognizer stored in the setting storage, and
register the settings for the occupant unidentifiable by the recognizer in the database.

12. The occupant monitoring device for the vehicle according to claim 11, wherein the detector is further configured to detect an operation of a shift lever of the vehicle to a parking position.

13. The occupant monitoring device for the vehicle according to claim 12, further comprising an updater configured to update the setting storage using the setting value associated with the occupant information in the recognized occupant storage, wherein the setting value is in the database.

14. The occupant monitoring device for the vehicle according to claim 11, further comprising
an updater configured to update the setting storage using the setting value associated with the occupant information in the recognized occupant storage, wherein the setting value is in the database.

15. The occupant monitoring device for the vehicle according to claim 11, wherein
the monitor is further configured to monitor the one or more occupants while the vehicle is driven,
the recognizer is further configured to recognize the one or more occupants while the vehicle is stopped,
when driving of the vehicle is started before the recognition processing by the recognizer is completed, the recognizer is further configured to suspend the recognition processing, and the monitor is further configured to monitor the one or more occupants riding in the vehicle, and
when the vehicle is stopped subsequently, the recognizer is further configured to resume the suspended recognition processing.

16. The occupant monitoring device for the vehicle according to claim 15, wherein
the setting storage is further configured to store setting for starting or stopping the recognizer, and
when the recognizer is stopped during the recognition processing, the recognizer is further configured to suspend the recognition processing.

17. The occupant monitoring device for the vehicle according to claim 10, further comprising
an updater configured to update the setting storage using the setting value associated with the occupant information in the recognized occupant storage, wherein the setting value is in the database.

18. The occupant monitoring device for the vehicle according to claim 1, wherein
the monitor is further configured to monitor the one or more occupants while the vehicle is driven,
the recognizer is further configured to recognize the one or more occupants while the vehicle is stopped,
when driving of the vehicle is started before the recognition processing by the recognizer is completed, the recognizer is further configured to suspend the recognition processing, and the monitor is further configured to monitor the one or more occupants riding in the vehicle, and
when the vehicle is stopped subsequently, the recognizer is further configured to resume the suspended recognition processing.

19. The occupant monitoring device for the vehicle according to claim 18, wherein
the setting storage is further configured to store setting for starting or stopping the recognizer, and
when the recognizer is stopped during the recognition processing, the recognizer is further configured to suspend the recognition processing.

* * * * *